United States Patent [19]

Miller

[11] 4,030,451

[45] June 21, 1977

[54] BIRD FEEDER
[75] Inventor: Isobel Miller, Greenville, N.H.
[73] Assignee: Droll Yankees, Inc., Foster, R.I.
[22] Filed: Dec. 1, 1975
[21] Appl. No.: 636,553
[52] U.S. Cl. .................................. 119/51 R; 119/63
[51] Int. Cl.² ........................................ A01K 39/00
[58] Field of Search ................. 119/51 R, 61 R, 63
[56] References Cited
UNITED STATES PATENTS

| 1,148,873 | 8/1915 | Stocking | 119/61 |
| 2,856,898 | 10/1958 | Doubleday et al. | 119/51 R |
| 3,187,722 | 6/1965 | Gilmore et al. | 119/51 R X |
| 3,901,192 | 8/1975 | Adams | 119/51 R |

Primary Examiner—Hugh R. Chamblee
Attorney, Agent, or Firm—Salter & Michaelson

[57] ABSTRACT

A bird feeder construction of the type having a dish for receiving feed material and a hood member associated thereabove so as to protect said dish, not only from the elements, but also from access by undesirable bird species and other pests, such as squirrels and the like. Accordingly, the hood is not only adjustable in varying spaced positions above the dish but is further movable to a position wherein the terminal portions of the hood and dish are either on a level with each other or the hood extends therebelow so as to provide additional security to the feeding system. Additionally, even though the hood is so positioned with respect to the dish, it may at any time be freely upwardly withdrawn therefrom so as to provide complete access to the dish for refilling.

6 Claims, 4 Drawing Figures

BIRD FEEDER

BACKGROUND OF THE INVENTION

Bird feeders having adjustable hoods to protect feed material therein from the elements and unwanted species are commonly utilized. Such normally take the form of a hood vertically adjustable in varying positions above the feeder dish. For example, one such construction utilizes a flat roof which is vertically adjustable along a common supporting post for both the roof and the feed dish. Such known constructions necessitate that the hood or protective cover be positioned above the upper peripheral portions of the dish a distance sufficient to permit access by the birds to be fed. Such disposition, however, does not always provide adequate protection against the elements, such as wind, rain and snow. Such required spacing of the hood above the dish may further provide undesirable access to squirrels, which, although unable to feed directly through a narrow spacing, may by able to reach through such opening into the dish, thus obtaining scattering, or otherwise wasting feed material therein.

Accordingly, it is desirable to provide a bird feeder construction which, although retaining an alternative hood positioning feature to selectively attract a variety of bird species, further provides a greater degree of protection from the elements and reduced access to pests.

Another shortcoming of prior-art devices of this general nature is that, although utilizing adjustable hood or roof members as indicated above, generally the hood is either semi-permanently fixed in position either by some positive connection or by latching means which temporarily fixes such positioning, or at least renders it difficult to lift the hood when it is desired to refill the container. It is accordingly desirable to provide a bird feeder construction of the type under consideration wherein ease in refilling access to the container is achieved while still maintaining the advantages of the positive adjustment features of prior-art devices.

SUMMARY OF THE INVENTION

The present invention accomplishes these above-indicated aims while further avoiding prior-art shortcomings by the provision of a bird feeder construction having a container dish and an associated protective hood, said dish and hood interconnected by means of a rigid rod attached at one end thereof to the dish and having an intermediate portion passing through a central portion of the hood in such a manner that the hood is vertically slidable with respect to both said rod and the dish. The hood is preferably of dome-shaped configuration having an outwardly and downwardly extending skirt portion terminating in a peripheral edge laterally spaced from the outer peripheral edge of the dish. Means are also provided for adjustably positioning the hood with respect to the dish, whereby the hood may be selectively spaced above the upper portions of the dish, or moved to a lower position wherein the peripheral edge of the hood is either level or slightly below the upper edge of the dish. The hood is furthermore adapted to rest on such positioning means and is free to upwardly slide with respect to the rod and dish so as to provide free access for refilling the container dish.

It is accordingly a primary object of the instant invention to provide a bird feeder construction in which the spacing between hood and dish portions thereof may be varied between lower positions providing limited access to small bird species and high protection against pests, to higher positions providing greater access, and wherein the hood in all such positions may be freely upwardly moved when it is desired to refill the dish.

A further object of the present invention is the provision of a bird feeder construction which assures adjustable spacing between a protective hood member and a lower feed material receiving dish so that selective attraction of bird species may be accomplished.

A still further object of the present invention is the provision of a bird feeder construction which provides a measured access opening between laterally adjacent peripheral portions of a feed material receiving dish and its protective hood in such a way so as to simultaneously provide access to desired species and high security against unwanted species and other pests.

Other objects, features, and advantages of the invention will become apparent as the description thereof proceeds when considered in connection with the accompanying illustrative drawings.

DESCRIPTION OF THE DRAWING

In the drawing which illustrates the best mode presently comtemplated for carrying out the present invention.

DESCRIPTION OF THE INVENTION

Figure 1:
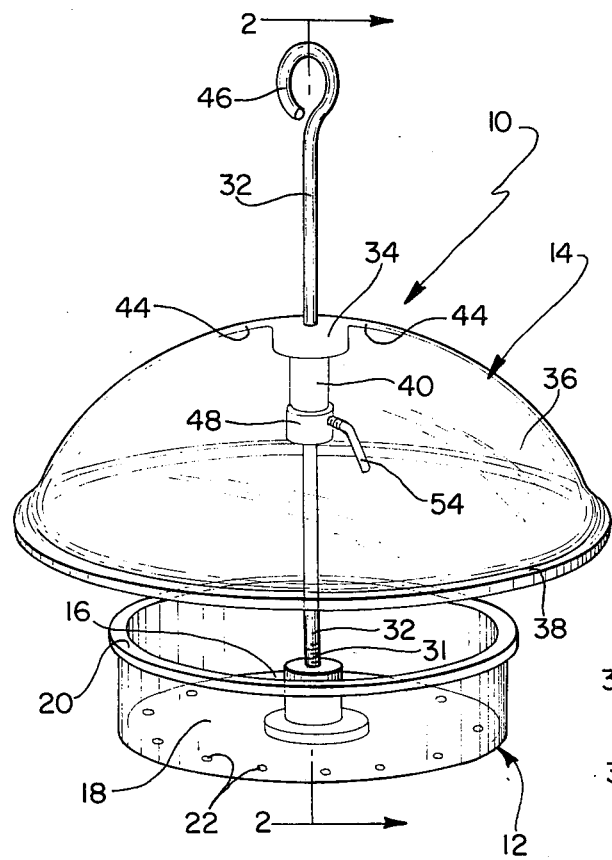
FIG. 1 is a perspective view of the bird feeder of the present invention shown in its conventional operational mode, that is, with the protective hood disposed in a position spaced above the feed material dish.

A bird feeder device 10 is shown comprising a container or dish 12 for receiving feed material such as seed, suet and the like and a protective hood 14 disposed thereabove and, as will become evident as the description proceeds, adjustable in its vertical disposition with respect to the dish. The container or dish 12 is preferably of circular configuration having a base 16 and upstanding side walls 18 which terminate in a peripheral outwardly extending flange 20 which serves to stiffen the upper rim of the container 12. The base 16 thereof is further provided with a plurality of drainage openings 22 so that water and the like may freely pass from the dish 12 so as to minimize the potential harm to the feed materials contained therein.

The central portion of the dish 12 is also provided with an upwardly extending integral boss 24 having at the lower surface thereof a plurality of outwardly radiating reinforcing ribs 26 so as to reinforce or stiffen the base 16 thereof. The boss 24 in turn includes an upwardly extending threaded lower opening 28 for receipt of a secondary supporting member, such as a threaded post or the like (not shown), so that the feeding device 10 may be supported thereon, if desired. The upper surface of the boss 24 is also provided with a threaded opening 30 for receiving the threaded end 31 of a rigid rod 32 which serves to connect the dish 12 to the hood 14 in a manner which will be more clearly brought out. The rod 32 may also be affixed to the boss 24 in alternative manners, such as by welding or adhesive connection. Similarly, other such means may be provided for connecting a post or other secondary supporting member to the boss 24. It should furthermore be brought out at this time that rather than directly forming the connecting means, such as the threads in bores 28 and 30 as above indicated, a separately threaded insert of brass or other non-corroding material may be secured to the boss 24 by known means, such as insert molding.

The hood 14 is preferably of dome-shaped configuration having a central portion 34 and an outwardly and downwardly extending wall 36 which terminate in an outwardly extending peripheral flange or skirt 38. The central portion 34 thereof is provided with an integral downwardly extending boss 40 having a smooth bore 42 provided therein for slidably receiving the rigid rod 32. The hood is furthermore provided with a plurality of reinforcing or stiffening ribs 44 extending radially outward from the boss 40 along the walls 36. The boss 40 is of a significant longitudinal extent so that adequate bearing contact between the rod 32 and portions of the bore 42 takes place so as to minimize any wobble or tilting of the hood's disposition with respect to the rod 32 and thus the dish 12. The diameter of bore 42 is such that the rod 32 is freely received thereby so as to eliminate binding therebetween when the hood is vertically moved relative to such rod. The other end of the rod 32 is provided with a hood 46 or other primary suspension means so that the device 10 may be suspended as from a wire, tree branch or other attachment means.

A collar 48 is disposed between the dish 12 and the hood 14 for adjustably positioning the hood with respect to the dish, it being understood that the bottom surface of boss 40 sits on collar 48. The collar is in turn provided with a threaded opening 50 for receipt of a set screw 52 having an outwardly extending handle portion 54. It is thus apparent that the collar 48 may be fixed to the rod 32 at varying positions therealong. In this manner then, the relative vertical spacing between the hood 14 and dish 12 can be changed, whereby the access opening for feeding birds may be regulated. This permits or excludes access to the feed material within the dish 12 to various bird species, dependent on the extent of such opening.

Figure 2:
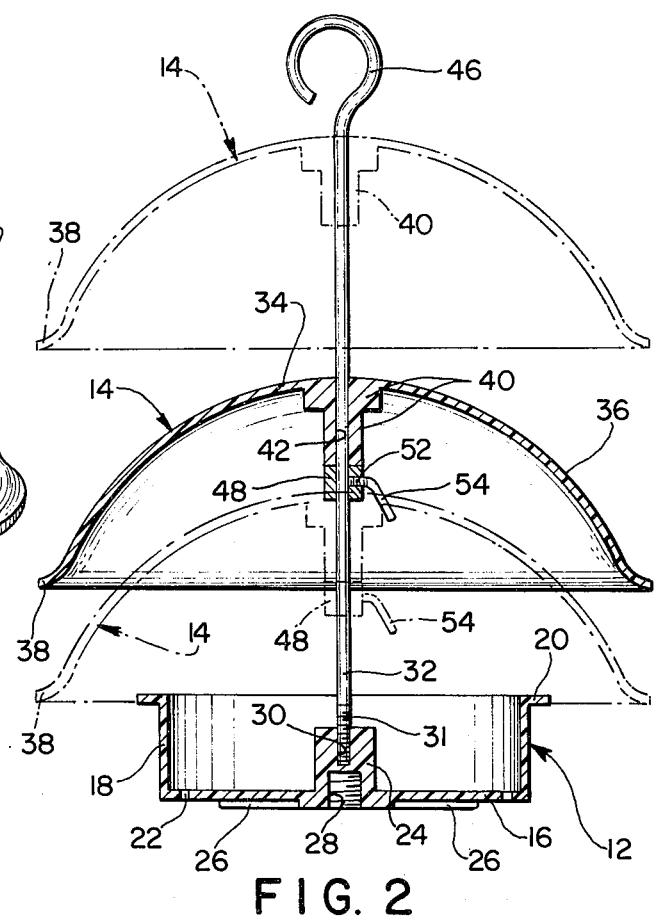
FIG. 2 is a side view of the bird feeder shown in FIG. 1 taken along line 2—2 thereof showing alternate hood positions in phantom.
Figure 3:
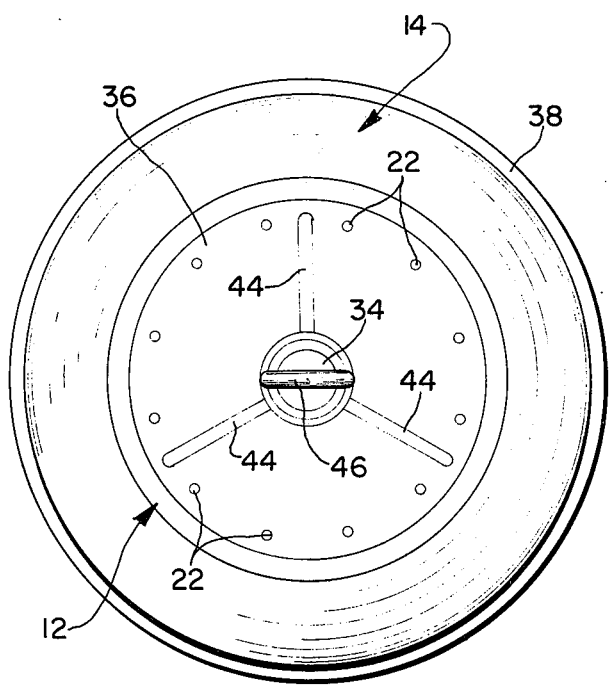
FIG. 3 is a top plan view of the device shown in FIG. 1.
Figure 4:
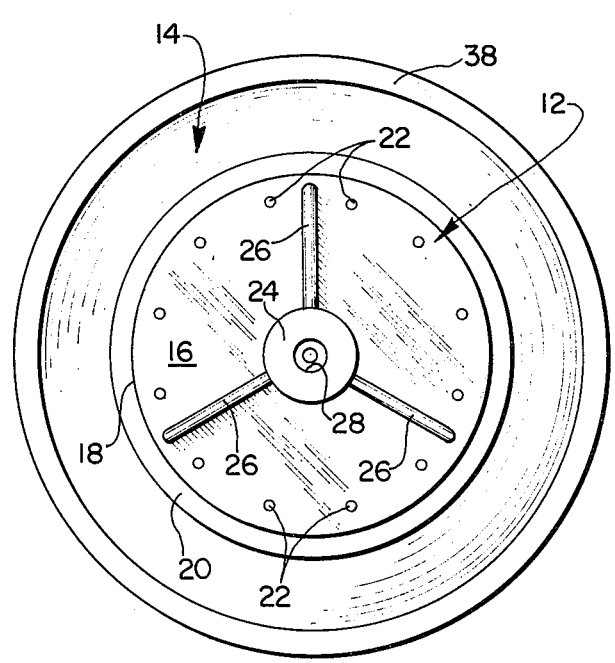
FIG. 4 is a bottom plan view of the device shown in FIG. 1.

It has specifically been found that when the ledge 38 is at least two inches vertically higher than the ledge 20, grosbeaks, blue jays and similar-size birds can easily gain access of the dish. When the collar 48 is loosened and placed in a lower position so as to reduce the vertical distance between the hood and dish, access to such larger bird species is reduced. In the lower feed position shown by the lower phantom lines in FIG. 2 of the drawing, the peripheral portions of the hood 14, that is, the ledge 38 thereof, is approximately level with the edge 20 of the dish 12. In such lower position, a lateral spacing S between the outer edge of flange 20 and the inner edge of flange 38 of approximately 1¼ inches has been found to be particularly effective, inasmuch as such spacing prevents entry of English sparrows while permitting the unobstructed feeding of more desirable species such as finches, chickadees and titmice. At the same time, said lower position also provides a high degree of protection against access to interior portions of the feed dish 12 by squirrels and the like.

The position of the hood 14 may also be positioned below the lowered position above discussed to a position wherein the flange 38 of the hood 14 lies beneath the flange 20 of the dish 12, so as to even more fully prevent access by squirrels and the like. Furthermore, such a lowermost position additionally protects scattering of feed material by more fully blocking wind currents and offers almost complete protection from entry of rain and snow to the dish.

In any of the relative dish and hood positions above discussed, and hood 14 may be freely upwardly displaced by sliding such along the rod 32, thus quickly and easily increasing the spacing between the hood and the dish so as to gain access to the latter without hood interference. Such action is desirable when refilling the dish with feed material or removing unwanted material therefrom. After material or removing unwanted material therefrom. After such operation the hood is returned to its original position as determined by the position of the collar 48 upon the rod 32, simply by lowering the hood until boss 40 once again engages collar 48.

The dish and hood portions of the device are preferably formed of a relatively strong, rigid, weather-resistant and transparent material, such as LEXAN brand polycarbonate, molded to the configurations depicted. The rod 32 and the collar 48 may be formed of aluminum or other weather-resistant materials.

While there is shown and described herein certain specific structure embodying the invention, it will be manifest to those skilled in the art that various modifications of the parts may be made without departing from the spirit and scope of the underlying inventive concept and that the same is not limited to the particular forms herein shown and described except insofar as indicated by the scope of the appended claims.

What is claimed is:

1. A bird feeder and the like comprising a dish member for receiving feed material having a base and upstanding sides terminating in a peripheral portion,
   a hood member positioned above said dish, said hood having a central portion and a downwardly and outwardly extending wall terminating in a peripheral portion extending laterally beyond the peripheral portions of said dish,
   means for interconnecting and vertically positioning said hood with respect to said dish, said connection means attached at one end thereof to said dish and extending upwardly through said central portion of said hood, and
   means disposed on said connection means between said dish and said hood for adjustably positioning said hood with respect to said dish,
   said hood gravitationally resting on said positioning means wherein movement of the latter with respect to said connection means serves to vary the spacing between said respective peripheral portions from upper positions wherein said hood peripheral portions are disposed above said dish to a lower portion wherein said hood peripheral portion is level with or below said dish peripheral portion, said hood being freely vertically movable upwardly from said positioning means with respect to said connection means so as to temporarily increase the spacing between said dish and said hood, said connection means comprising a rigid rod, said hood having a central opening for receipt of said rod and vertically slidable therewith, said positioning means comprising a collar mounted on said rod and vertically slidable therewith and means for fixing the position of said collar on said rod, said hood including a downwardly extending central boss having an internal bore therein defining said central opening for receipt of said rod, said boss adapted to contact said collar thereby supporting said hood, said dish having a central boss, said rod connected thereto at one end thereof and provided with primary feeder support means at the other end thereof, said boss further including means in the lower portion thereof for receipt of secondary feeder support means.

2. The bird feeder construction of claim 1, said hood being dome shaped and said dish being circular.

3. The bird feeder construction of claim 2, said dish peripheral portion terminating in an outwardly directed flange, said flange being laterally spaced from said hood peripheral portion a distance of approximately 1½ inch when said flange and said peripheral portion are substantially level with each other.

4. A bird feeder and the like comprising a generally circular dish member for receiving feeder material having a base and upstanding sides terminating in a peripheral portion, a rigid rod secured to said base and extending upwardly therefrom, a generally dome-shaped rigid hood member slidably mounted on said rod and means for adjustably positioning said hood member on said rod so that the lower peripheral edge of said hood member may be elevated with respect to said dish peripheral portion or it may be selectively lowered to a position wherein said edge is level with or lower than said peripheral portion, the diameter of said hood peripheral edge being substantially greater than the diameter of said dish, whereby when the lower peripheral edge of said hood member is approximately level with or slightly below said dish peripheral portion, sufficient space exists therebetween for small birds to gain feeding access to said dish member.

5. In the bird feeder of claim 4, said positioning means comprising a collar slidable on said rod and means securing said collar in a preselected position, said hood gravitationally resting on said collar but being freely movable upwardly therefrom, whereby the spacing between said hood and said dish may be readily increased whenever it is desired to gain access to the dish for any reason.

6. In the bird feeder of claim 4, the diameter of said hood peripheral edge being approximately 3 inches greater than the diameter of said dish.

* * * * *